United States Patent
Thoman

(10) Patent No.: US 6,546,978 B2
(45) Date of Patent: Apr. 15, 2003

(54) PORTABLE TABLE SAW STAND

(76) Inventor: Fred Thoman, 3921 E. 65th Ave., Anchorage, AK (US) 99507

( * ) Notice: Subject to any disclaimer, the term of this patent is extended or adjusted under 35 U.S.C. 154(b) by 0 days.

(21) Appl. No.: 09/862,555

(22) Filed: May 21, 2001

(65) Prior Publication Data

US 2002/0170630 A1 Nov. 21, 2002

(51) Int. Cl.[7] .................................................. B25H 1/04
(52) U.S. Cl. ............................ 144/286.1; 144/286.5; 83/477.2
(58) Field of Search ....................... 144/285, 286.1, 144/286.5, 1.1, 48.4, 48.3; 83/477.2, 477, 473, 490, 471.3; 108/157.1

(56) References Cited

U.S. PATENT DOCUMENTS

| | | | | |
|---|---|---|---|---|
| 2,139,470 A | * | 12/1938 | Schmeiser | 144/286.1 |
| 2,854,044 A | * | 9/1958 | Raguse | 144/286.1 |
| 3,342,226 A | * | 9/1967 | Marcoux et al. | 144/286.1 |
| 4,318,432 A | * | 3/1982 | Howey | 144/48.3 |
| 4,640,326 A | * | 2/1987 | Hewitt | 108/134 |
| 4,874,025 A | * | 10/1989 | Cleveland | 144/286.1 |
| 4,890,654 A | * | 1/1990 | Fox | 144/48.4 |
| 5,725,037 A | * | 3/1998 | Faulhaber | 144/285 |
| 6,360,797 B1 | * | 3/2002 | Brazell et al. | 144/286.1 |

* cited by examiner

*Primary Examiner*—Allen Ostrager
*Assistant Examiner*—Shelley Self
(74) *Attorney, Agent, or Firm*—Michael J. Tavella

(57) ABSTRACT

A two-part portable table saw stand system. The first part is a large folding table. The table can be folded relatively flat for storage or hauling. Once opened, it forms a large work surface. At one end of the table is a lower shelf. This shelf holds a portable table saw so that the table of the saw is flush with the top of the folding table. This allows wood to flow across the surfaces without binding. The second part of the system is a table saw carrier. The carrier is designed to hold the table saw. It has two wheels at one end and handles at the other. The saw is fastened to the carrier so that it can be wheeled from a truck to the job site or vice versa. The lower shelf of the folding table has a special bracket system that receives the table saw carrier.

11 Claims, 8 Drawing Sheets

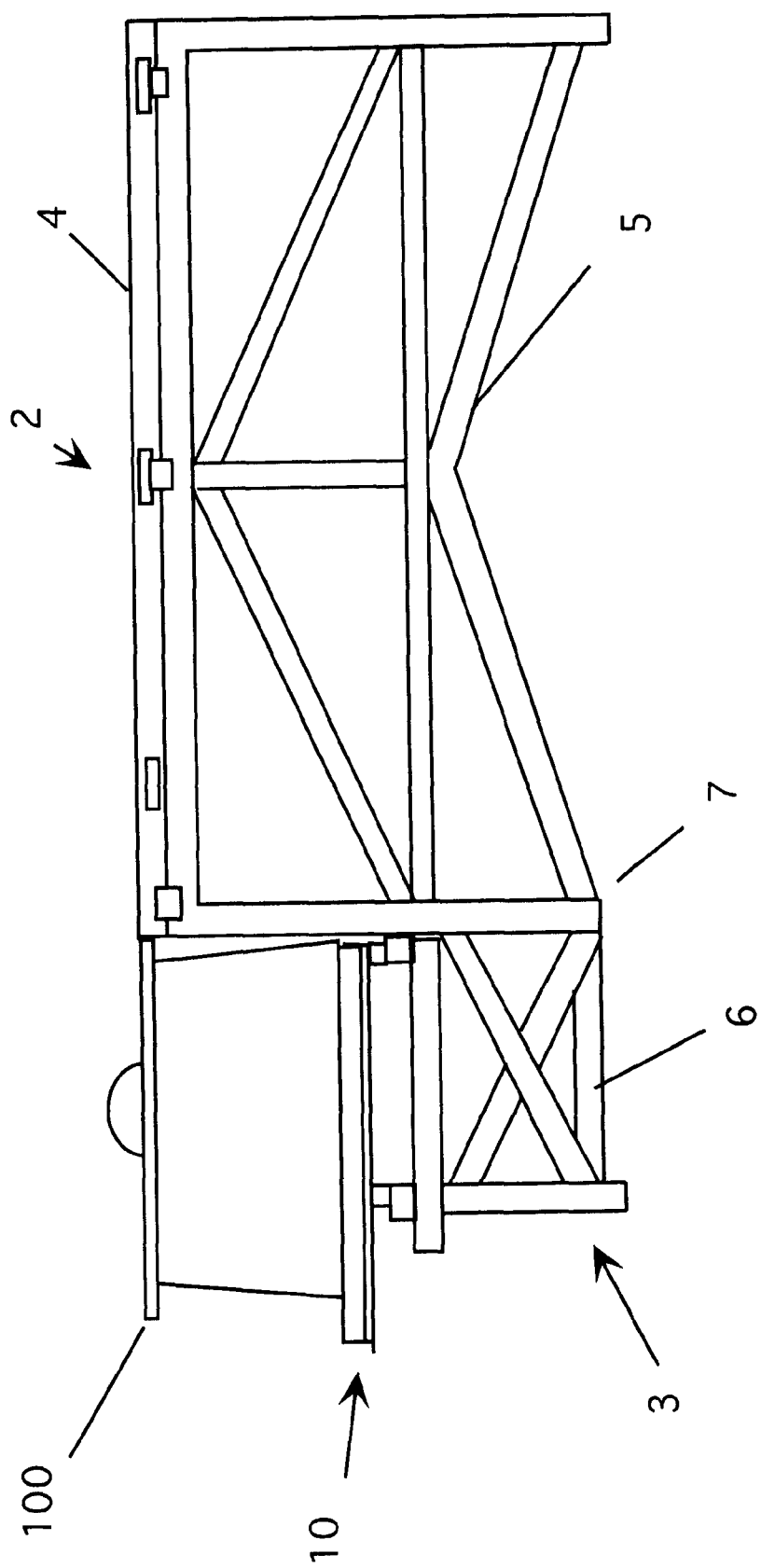

PORTABLE TABLE SAW STAND

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention pertains to table saw stands and particularly to portable table saw stands.

2. Description of Related Art

The table saw is the mainstay of a woodworking shop. These saws are large, heavy and meant to be permanently installed in place. Over the years, smaller, portable table saws, often called bench saws or contractor saws have been developed. These smaller saws can be carried to a job site of bolted to a bench. The advantage of such saws is that they are portable. Contractors can carry them to a job site and use them during construction. Typically, they are secured to a temporary bench or set up on metal base stands.

Many woodworking hobbyists also use these saws when workshop space is at a premium. Often these saws are stored in a corner of a garage or other space and then taken out and set up for use-typically on a metal stand or on a folding worktable.

Despite the many advantages these saws have, they are limited in their ability to handle large workpieces. Typically, their tables are only a couple of feet square. There is little room behind the blade to hold stock as it is being cut. Without proper support, it is difficult for one person to cut large pieces of wood. To compensate for this limitation, some portable saws have pull out extensions that extend the carrying capacity of the saw for an extra 12–18 inches. Roller stands are also available for supporting longer pieces. Although these help, they are not enough. Not only is the run out space limited, the cutting surface is also limited. In other words, the width of the cut is limited to the amount of space the fence can travel.

These two limitations have been addressed by making portable table saw stands. These stands are in fact, rather large and cumbersome. Although they provide better cutting surfaces and more room, they are difficult to carry and set up.

BRIEF SUMMARY OF THE INVENTION

To overcome these limitations, I have devised a portable table saw stand system. The system has two parts. The first is a large folding table. The table can be folded relatively flat for storage or hauling. Once opened, it forms a large work surface. At one end of the table is a lower shelf. This shelf holds the saw so that the table of the saw is flush with the top of the folding table. This allows wood to flow across the surfaces without binding.

The second part of the system is a table saw carrier. The carrier is designed to hold the table saw and is set up like a dolly. It has two wheels at one end and handles at the other. The saw is fastened to the carrier so that it can be wheeled from a truck to the job site or vice versa. The lower shelf of the folding table has a special bracket system that receives the table saw carrier. The bracket system is adjustable so that virtually any small table saw can be set up on the table. Once the saw is adjusted, the brackets can be left in place so that the user can place the saw in the brackets and they are always aligned.

It is an object of the invention to produce a folding table saw stand that is easily transportable.

It is another object of the invention to produce a folding table saw stand that has a separate table saw carrier.

It is yet another object of the invention to produce a folding table saw stand that has an adjustment system to align the saw table to the saw table stand for ease of use.

It is yet another object of the invention to produce a folding table saw stand that is easily folded for transport and easily opened for use.

BRIEF DESCRIPTION OF THE DRAWINGS

FIG. 10 is a side view of the table saw table open for use, with a table saw in place.

DETAILED DESCRIPTION OF THE INVENTION

Figure 1:
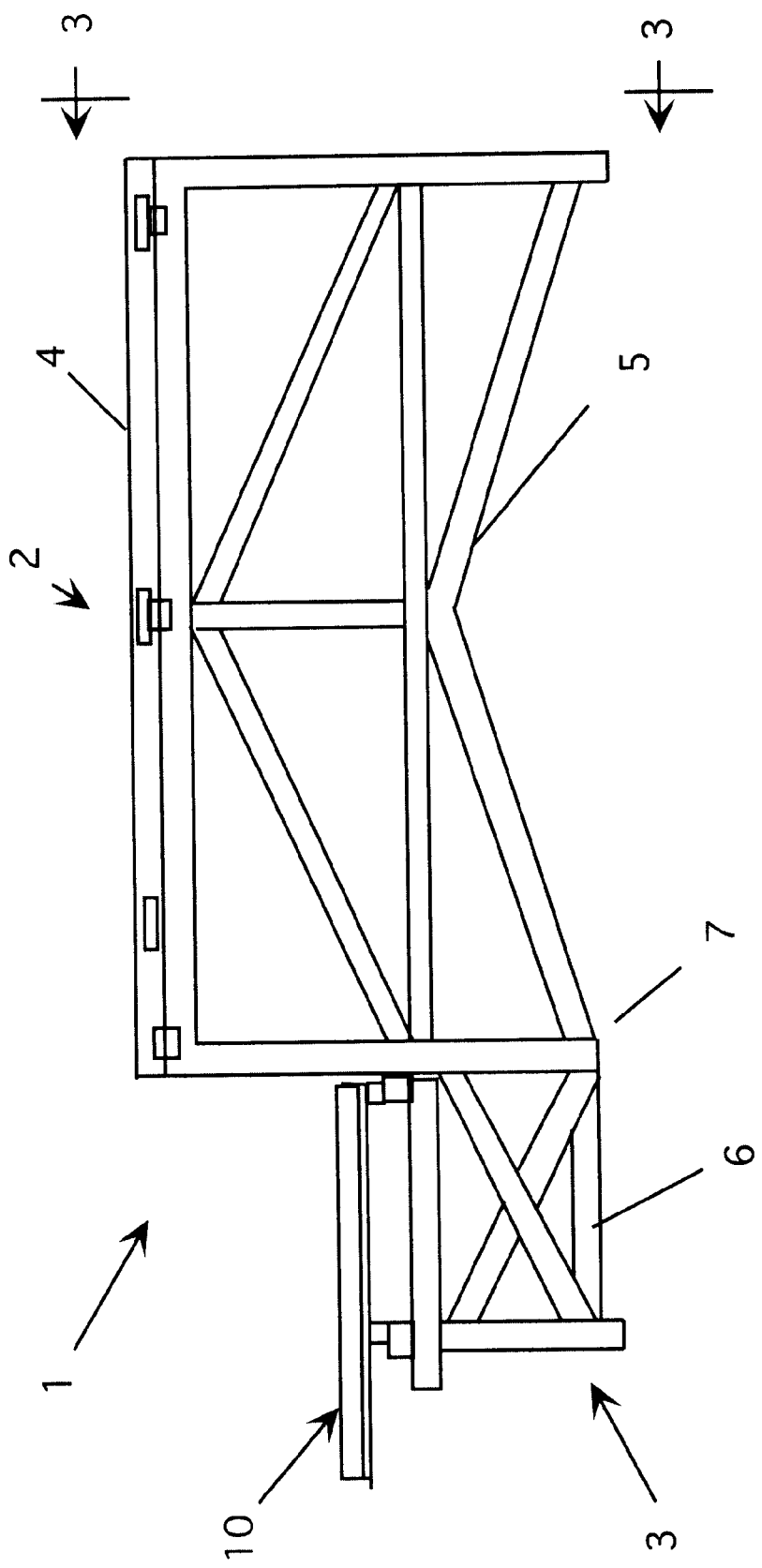
FIG. 1 is a side view of the table saw table open for use, without a table saw in place.

Referring now to FIG. 1, the saw table 1 is shown. The saw table has two major sections. First, there is a large table top 2. A smaller saw stand 3 is formed on one end of the saw table as shown.

The table portion 2 has a large flat table surface 4. Two folding legs 5 are attached to the tabletop 4. Details of this assembly are discussed below. The small saw stand is made up of two parts. The lower part 6 is formed at one end 7 of the folding legs 5 as shown. This part is actually an extension of the folding legs that has a reduced height to accommodate the saw so that the saw table built into the table saw sits flush with the table top 4. These folded legs are identified as 6a and 6b in FIG. 2. The second part of the small saw stand is made up of the removable saw carrier 10, which is discussed in detail below. The removable saw carrier 10 is designed to be secured to the lower part 6 of the small saw stand by means of clips that are described below.

These major assemblies form the invention. The removable saw carrier holds the table saw on a convenient wheel system, much like a dolly. This permits the saw to be moved easily from the job site to a vehicle or vice versa. The large table 2 has a large flat surface for supporting large sheets of wood and a pair of folding legs that support both the table and saw stand. When folded, the legs permit the table 2 to be stored flat for storage or transport.

Figure 2:
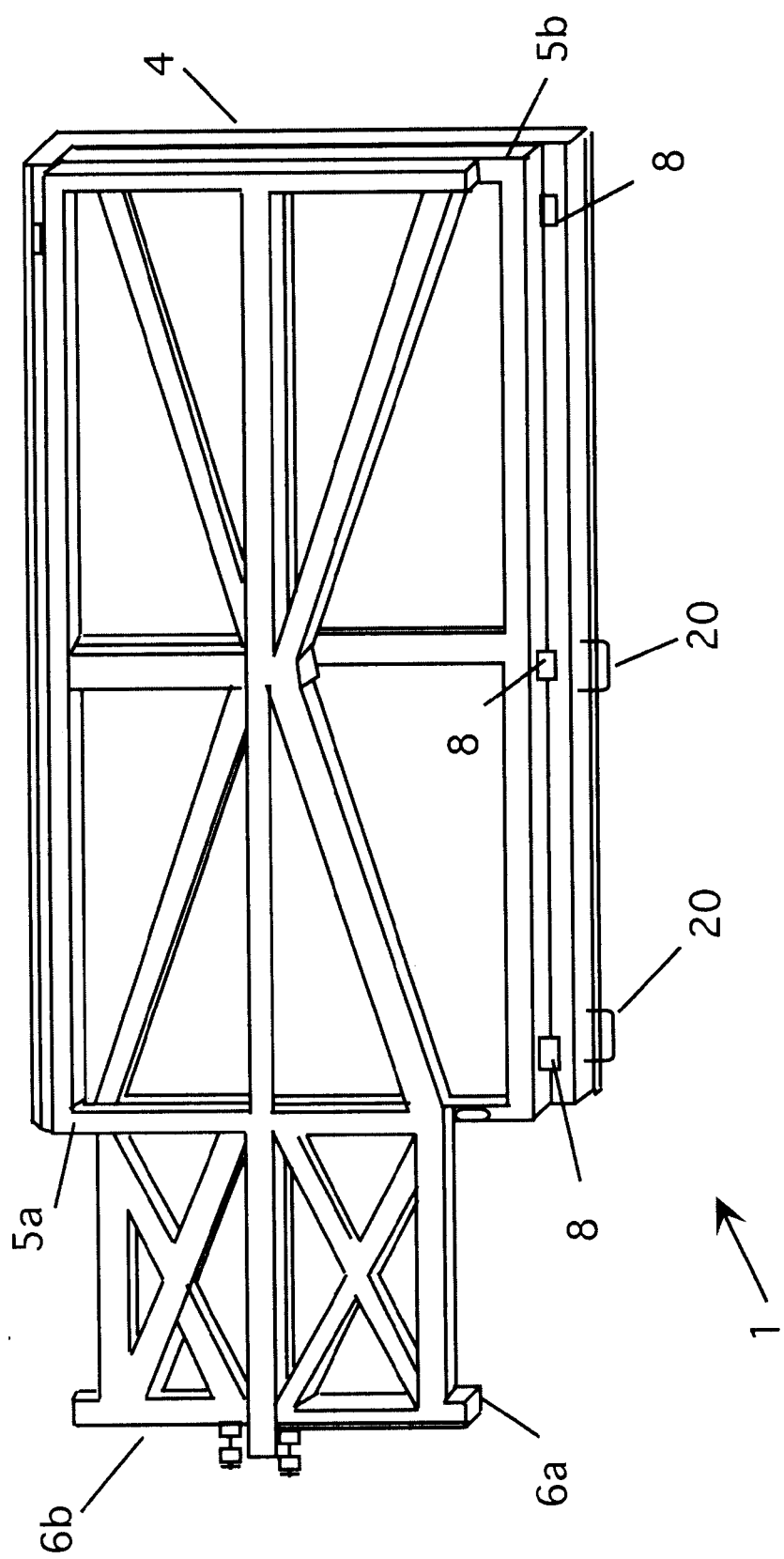
FIG. 2 is a side view of the table saw table folded for storage.

FIG. 2 shows the table in its folded position for transport or storage. As shown in that figure, the folding legs 5 are attached to the bottom of the tabletop 4 by hinges 8. The hinges 8 are designed to be heavy-duty style that can support heavy weights and repeated operations. The hinges are staggered so that one leg (5*a*) folds up onto the bottom of the table top, while the other leg 5*b*, folds onto the leg 5*a*. Barrel bolts (not shown) or similar fasteners are used to secure the legs together when folded for transport or storage. FIG. 2 also shows a number of handles 20 that are fastened to the tabletop using ordinary hardware. These handles 20 allow the table 2 to be carried easily.

Figure 3:
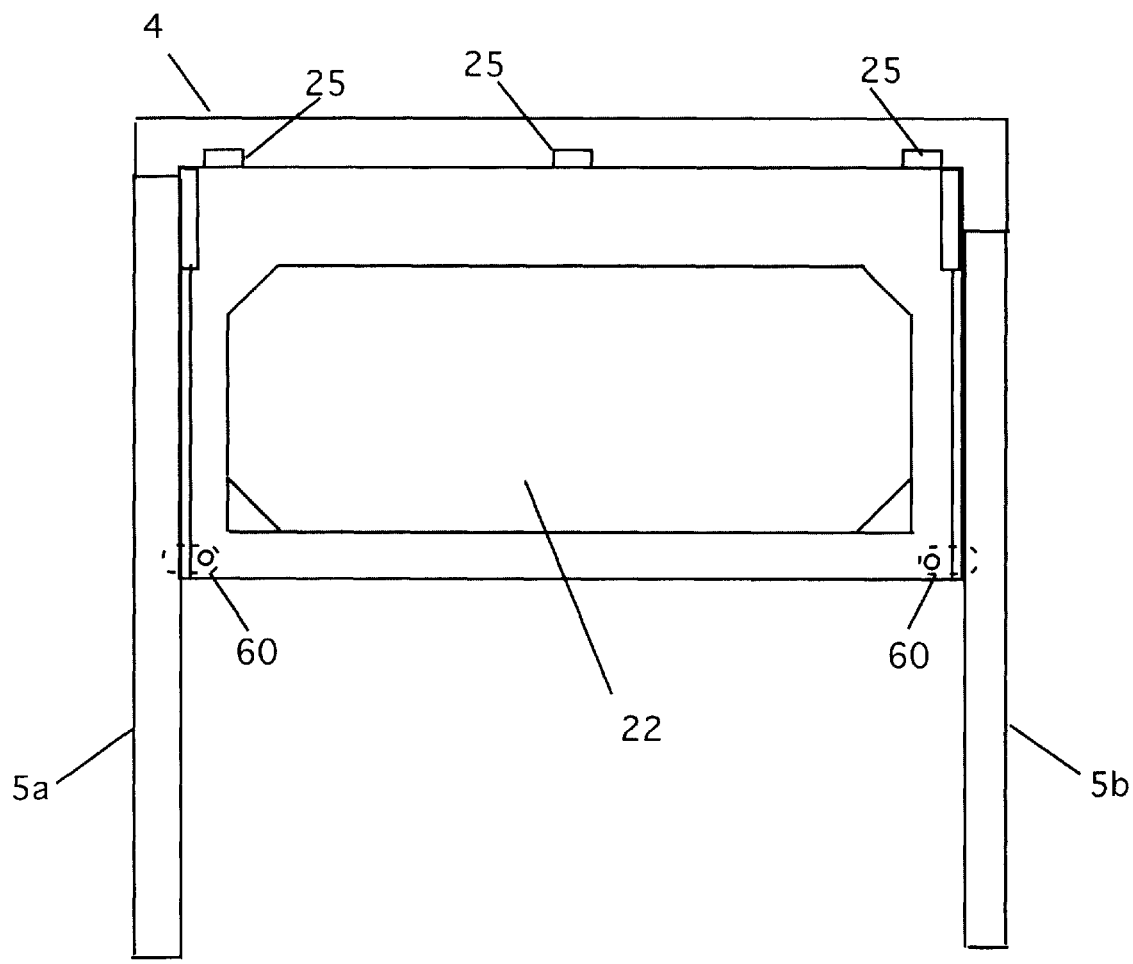
FIG. 3 is an end view of the tabletop portion of the saw table taken along the lines 3—3 of FIG. 1.
Figure 4:
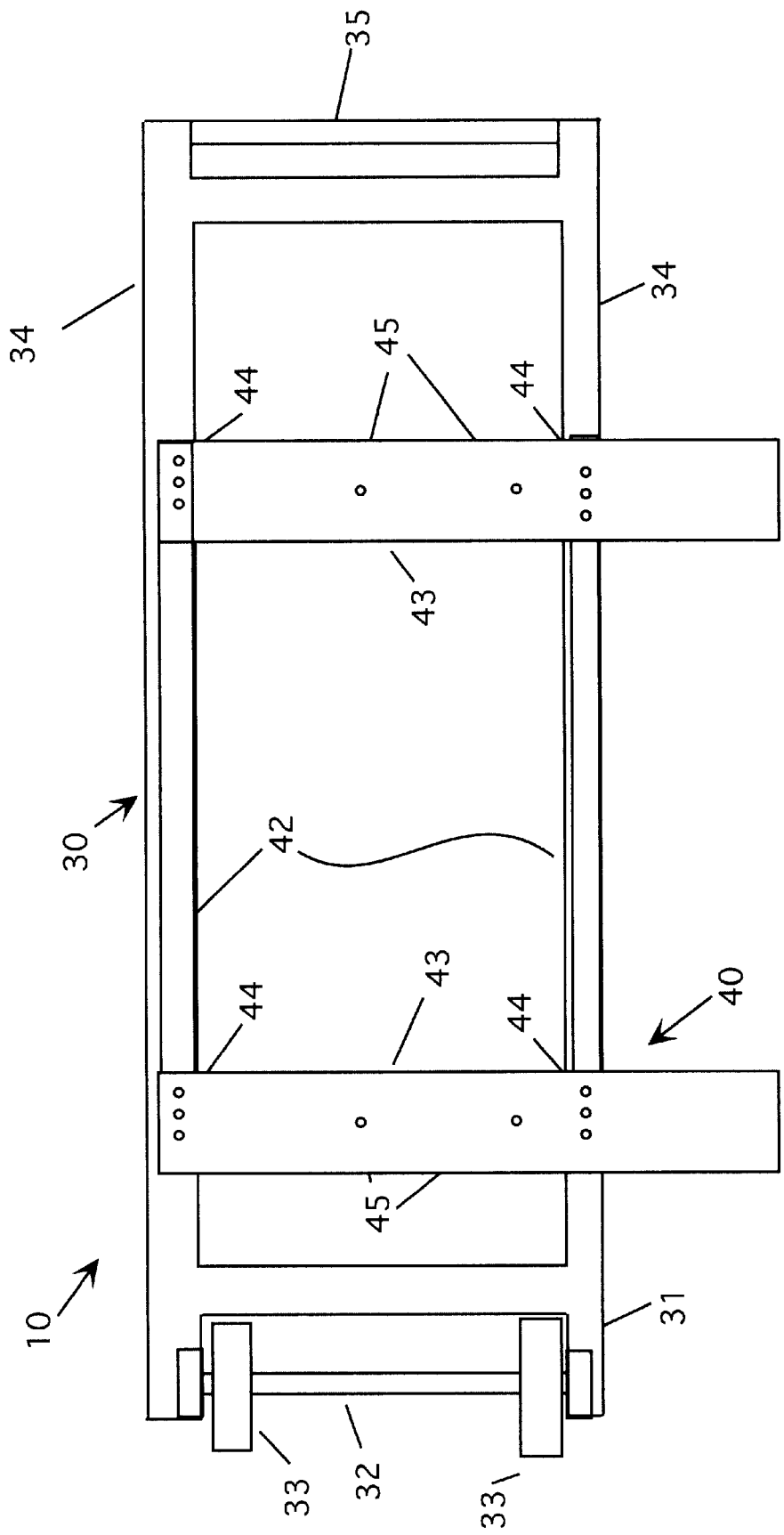
FIG. 4 is a top view of the saw platform.
Figure 7:
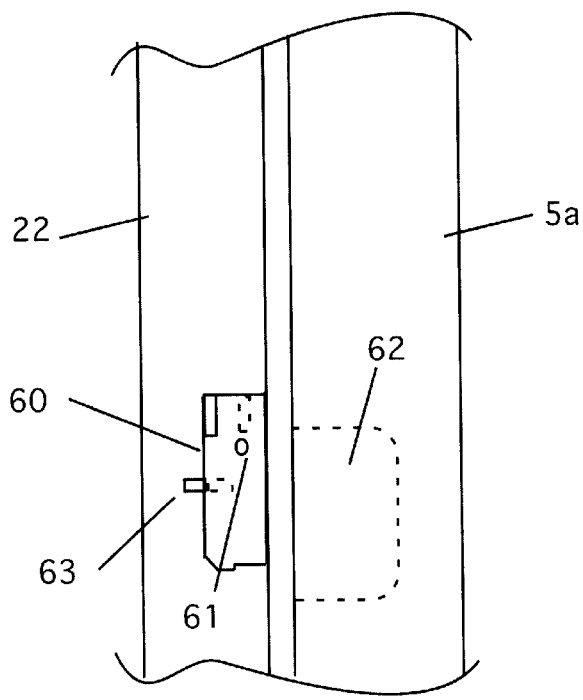
FIG. 7 is a detail view of one of the latch assemblies for the tabletop in the unlatched position.
Figure 8:
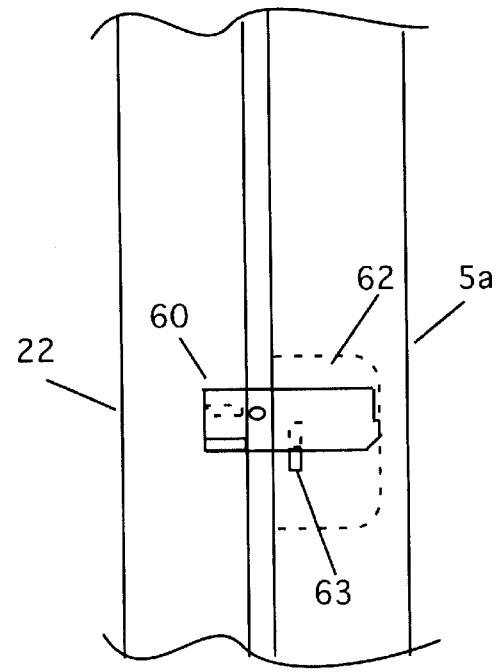
FIG. 8 is a detail view of one of the latch assemblies for the tabletop in the latched position.
Figure 9:
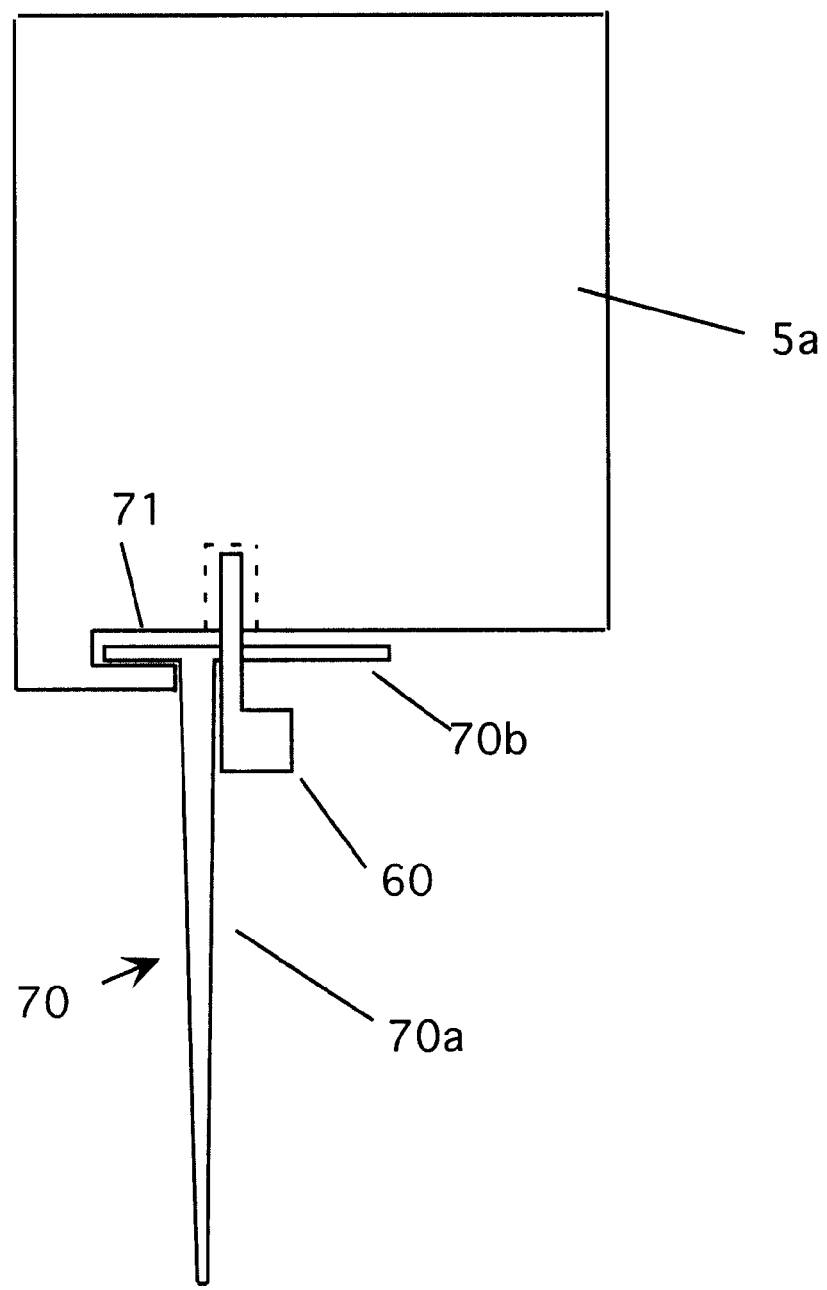
FIG. 9 is a top detail view of the latching system for the legs.

FIG. 3 shows an end view of the opened table taken along the lines 3—3 of FIG. 1. To provide additional rigidity to the table, two end panels 22 are used. Note that these end panels can be considered as locking end plates. These end panels are attached to the table top 4 by hinges 25, as shown. When the legs 5 are opened for use, the end panels are dropped down into place. Once lowered, the end plates are latched to the legs 5 using latches 60 as shown in FIGS. 7–9. The latches 60 are designed to be a snap type than lock into place when the legs are opened, and release when a catch is depressed. These are discussed in detail below.

At the other end of the frame 30, are two extensions 34 that support a handle 35. Note that the handle can be any style. The handle shown is preferred because it conforms to the dimensions of the frame.

A saw platform 10 is removably attached to the frame 30. The saw carrier 40 has two mounting brackets 42 and two crossbars 43. The crossbars have a number of mounting holes 44 formed in them to receive the mounting brackets 42. These holes 44 are used to mount the crossbars to the frame 30. There are several holes at 44, which are used to space the crossbars 43 at the proper distance to accommodate different styles of bench table saws. Mounting holes 45 are provided in the crossbars 43 to secure the saw to them. Thus, the saw platform is installed by securing the mounting brackets 42 to the frame 30, and then the crossbars to the mounting brackets using bolts 50 or similar fasteners, and then fastening the saw to the mounting brackets, also using common fasteners.

Figure 5:
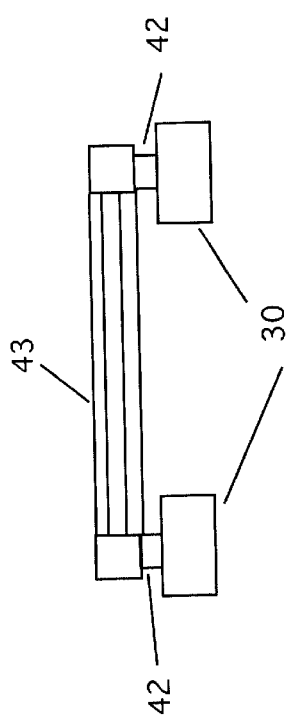
FIG. 5 is an end view of the saw platform.

FIG. 5 is an end view of the saw table showing the components from that perspective.

Figure 6:
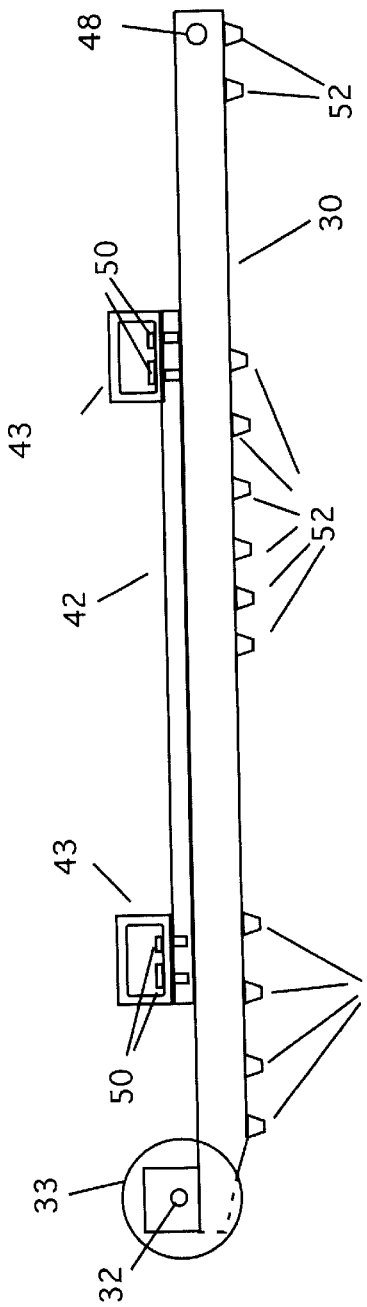
FIG. 6 is a front view of the saw platform.

FIG. 6 shows a front view of the saw platform 40. Here, the bolts 50 that attach the cross bar 42 to the mounting brackets 41 are shown. A number of tapered stops 52 are attached to the bottom of the frame 30 as shown. See also, FIG. 5. These tapered stops are designed to fit over the support rails on the main table frame (see also, FIG. 1).

FIGS. 7–9 show details of the leg latching system. Many types of latches can be used to secure the legs in an open position. For example, barrel bolts or hooks can be used. In the preferred embodiment, however, a turning spring latch is used. These latches have a release mechanism that when depressed releases the latch. These latches are preferred because they provide a sturdier platform for the saw table. Other latching mechanisms work, but do not provide the stability of a more robust latch.

FIG. 7 shows one of the latches 60 in the open or unlatched position. The latch 60 is secured to the rail of the side panel 22 as shown in FIG. 3. Note that in FIG. 3 the latches 60 are shown in the latched position. FIG. 7 shows the latch 60 is a generally rectangular member that is rotatably fixed to the panel by a pivot 61. The pivot may be a common fastener such as a screw or bolt. FIG. 7 also shows one of the legs 5 aligned with the latch. Note that the leg 5 has a recess 62 cut into the leg 5 as shown. The recess receives the latch as shown in FIG. 8.

FIG. 8 shows the panel secured to the leg 5. The latch is rotated into the leg as shown. The latch 60 has a release button or thumb bar 63 this is pushed to release the latch to allow the table to be folded for storage.

Although the latching system works by itself, the preferred embodiment also uses an additional means of providing support for the legs. FIG. 9 shows a top view through one of the legs 5. At the sides of the end panels are interlocking corner brackets 70. As shown in FIG. 3, these brackets run the length of the end panels. A groove 71 is formed in the face of each leg 5 to receive the corner brackets. As shown in FIG. 9, the corner brackets have a horizontal portion 70*a* and a perpendicular end portion 70*b*. One end of the perpendicular end portion is designed to fit into the groove. The other end extends outward past the end of the latch 60. Thus, when the latch is turned to the latched position is rests on top of the perpendicular end portion 70*b* as shown. In this way, the lags and the end panel are locked in place in a most stable structure.

To operate the saw table, the main table is opened and the legs are locked into the operating position. The saw carrier is moved into position and placed on the lower support rails of the main table as shown in FIG. 1. With the saw 100 in place, the height of the saw 100 can be adjusted with shims or other means so that the top of the saw table on the saw itself is even with the top of the main saw table. This is shown in FIG. 10. In this way, workpieces can be moved over the saw and onto the main table without impediment.

To store the saw table, the saw carrier is first removed form the support rails of the main table. Using the wheels, the support carrier can be moved to a storage area or can be placed onto a truck for transport. The main table can be stored by releasing the leg clips and folding the legs up as shown in FIG. 2. The handles can then be used to move the table to a storage location or onto a truck for transport.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A folding saw table comprising:
   a) a table top;
   b) a pair of support legs, hingably attached to said table top, said pair of support legs having a table portion having a height, and a saw portion having a height, wherein the height of said saw portion being lower than the height of said table portion and further wherein said saw portion extends forward from said table top such that said saw portion is not covered by said table top;
   c) a means for releasably securing said pair of support legs in an operating position;
   d) a saw carrier, removably attached to said saw portion of said pair of support legs; and
   e) a means for securing a table saw to said saw carrier.

2. The folding saw table of claim 1 wherein the saw carrier has a first end and a second end, and wherein said saw carrier has a handle on the first end and a pair of wheels attached to the second end.

3. The folding saw table of claim 1 wherein the means for releasably securing said pair of support legs in an operating position includes a set of latches.

4. The folding saw table of claim 1 wherein said table saw has a top and further wherein when said saw carrier is in position on said saw portion of said pair of support legs, the top of said table saw is flush with said table top.

5. The folding saw table of claim 1 wherein the saw carrier comprises:
   a) a rectangular frame, said rectangular frame having a first end and a second end, and a bottom;
   b) an axle, operable installed on said first end of said rectangular frame;
   c) a pair of wheels, rotatably attached to said axle;
   d) a handle, attached to the second end of said rectangular frame; and
   e) a saw platform, removably attached to the rectangular frame, to support a portable table saw.

6. The folding saw table of claim 5 wherein the saw platform further comprises:
   a) a pair of crossbars, adjustably attached to said saw platform, each of said pair of crossbars having a plurality of mounting holes formed therein;
   b) a means for securing the pair of crossbars to said rectangular frame;
   c) a pair of mounting brackets, removably attached to said pair of crossbars; and
   d) a means for securing said portable table saw to said pair of mounting brackets.

7. The folding saw table of claim 6 wherein said saw platform further comprises:
   a) a plurality of tapered stops, attached to the bottom of the rectangular frame, whereby said plurality of rectangular stops engage the saw portion of said pair of support legs.

8. A folding saw table comprising:
   a) a table top;
   b) a pair of support legs, hingably attached to said table top, said pair of support legs having a table portion having a height, and a saw portion having a height, wherein the height of said saw portion being lower than the height of said table portion and further wherein said saw portion extends forward from said table top such that said saw portion is not covered by said table top;
   c) a pair of locking end plates, hingably attached to said table top such that said pair of locking end plates engage the pair of support legs when said pair of support legs are in an open position;
   d) a means for releasably locking said pair of locking end plates to said pair of support legs;
   e) a saw carrier, said saw carrier including:
      i) a rectangular frame, said rectangular frame having a first end and a second end, and a bottom;
      ii) an axle, operable installed on said first end of said rectangular frame;
      iii) a pair of wheels, rotatably attached to said axle;
      iv) a handle, attached to the second end of said rectangular frame; and
      v) a saw platform, removably attached to the rectangular frame, to support a portable table saw; and
   f) a means for securing the saw carrier to saw portion of said pair of support legs.

9. The folding saw table of claim 8 wherein the saw platform further comprises:
   a) a pair of crossbars, adjustably attached to said saw platform, each of said pair of crossbars having a plurality of mounting holes formed therein;
   b) a means for securing the pair of crossbars to said rectangular frame; and
   c) a pair of mounting brackets, removably installed in said mounting holes in said pair of crossbars.

10. The folding saw table of claim 8 wherein a means for securing the saw carrier to saw portion of said pair of support legs comprise:
   a) a plurality of tapered stops, attached to the bottom of the rectangular frame, whereby said plurality of tapered stops engages the saw portion of said pair of support legs.

11. The folding saw table of claim 8 wherein the means of releasably locking said pair of locking end plates to said pair of support legs comprise two pairs of latches; one of said two pairs of latches being operably attached to each of said pair of locking end plates.

* * * * *